Dec. 23, 1941.                G. N. SLEZSKINSKY                 2,267,430
          APPARATUS FOR CONNECTING BALANCED AND UNBALANCED
                    NETWORKS IN ELECTRICAL SYSTEMS
                        Filed July 20, 1940              2 Sheets-Sheet 1
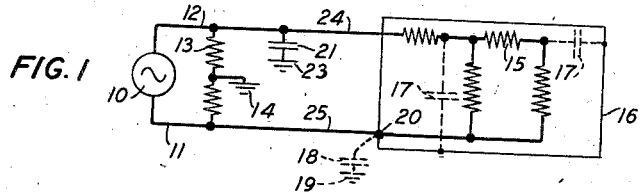
FIG. I
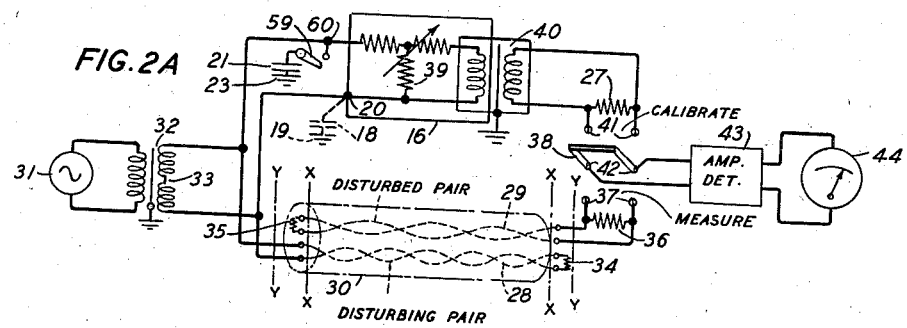
FIG. 2A
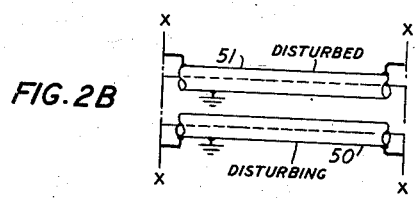
FIG. 2B
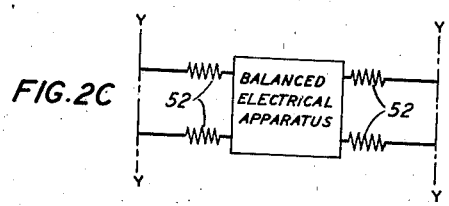
FIG. 2C
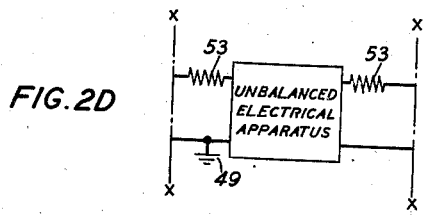
FIG. 2D
INVENTOR
G.N. SLEZSKINSKY
BY
H. A. Burgess
ATTORNEY Dec. 23, 1941.  G. N. SLEZSKINSKY  2,267,430
APPARATUS FOR CONNECTING BALANCED AND UNBALANCED
NETWORKS IN ELECTRICAL SYSTEMS
Filed July 20, 1940    2 Sheets-Sheet 2
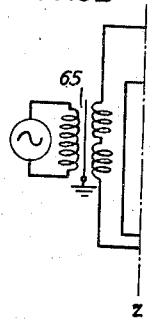
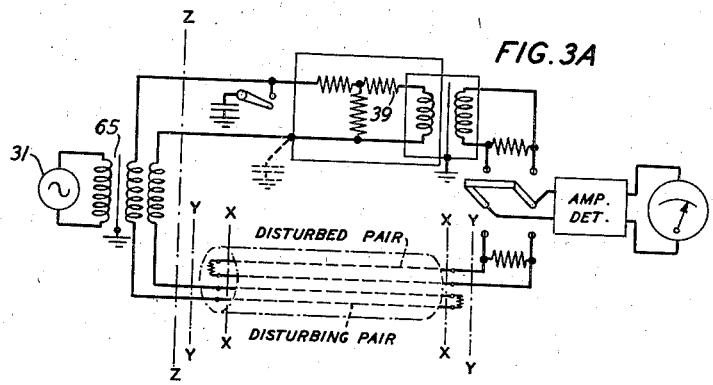
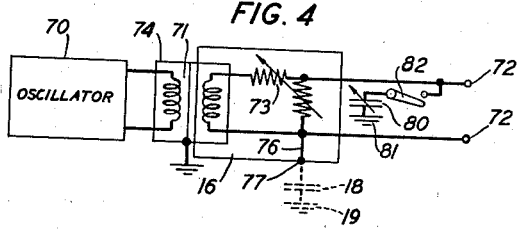
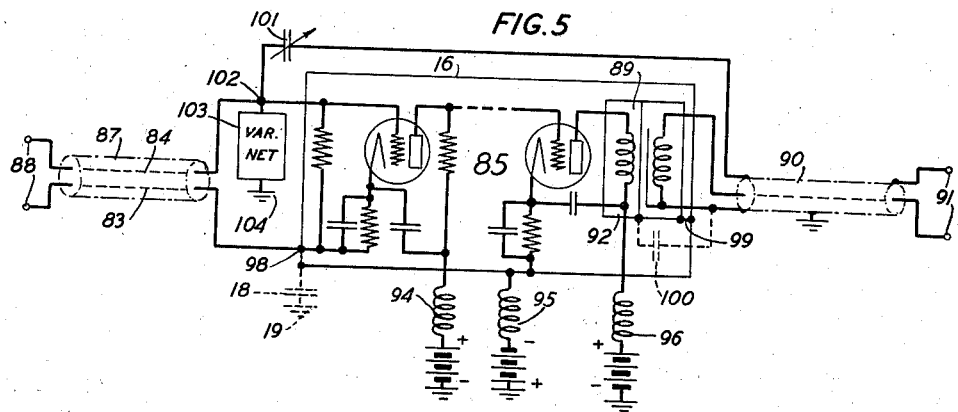
INVENTOR
G.N.SLEZSKINSKY
BY
ATTORNEY Patented Dec. 23, 1941

2,267,430

UNITED STATES PATENT OFFICE 2,267,430

APPARATUS FOR CONNECTING BALANCED AND UNBALANCED NETWORKS IN ELECTRICAL SYSTEMS

Gregory N. Slezskinsky, Dunellen, N. J., assignor to Western Electric Company, Incorporated, New York, N. Y., a corporation of New York Application July 20, 1940, Serial No. 346,567

5 Claims. (Cl. 179—175.3)

This invention relates to an arrangement for connecting in an electrical system networks balanced and unbalanced with respect to ground potential, and more particularly to an arrangement whereby a single attenuating network may be employed in measuring apparatus to accomplish measurements both balanced and unbalanced relative to ground.

Heretofore, discrete apparatus have been utilized to effect both cross-talk and/or loss measurements involving apparatus balanced and unbalanced with respect to ground potential. Thus, for example, one apparatus may be required for making such measurements in connection with the balanced pairs of a multiconductor cable and another apparatus may be required for making such measurements in connection with concentric conductor transmission lines. The one measuring apparatus may embody an attenuating network balanced with respect to ground potential and the other measuring apparatus may include an attenuating network unbalanced with respect to ground potential. Such individual measuring apparatus may involve not only additional manufacturing expense but also additional shipping expense, as the apparatus may be required to effect measurements at different points in an extensive transmission system. Accordingly, this invention contemplates a single apparatus which may be balanced and unbalanced with respect to ground potential.

It is a general object of the invention to connect in an electrical system networks balanced and unbalanced with respect to ground potential.

It is another object to connect metallically a network of electrical elements balanced with respect to ground potential to another network of electrical elements unbalanced with respect to ground potential.

It is a further object to utilize in measuring apparatus a single attenuating network unbalanced with respect to ground potential to effect measurements balanced and unbalanced with respect to ground potential.

It is a still further object to compensate for ground admittance due to a parasitic capacitor and parasitic capacitor conductance effect.

It is another object to connect in an electrical system networks which are neither balanced nor unbalanced-to-ground.

One apparatus to accomplish, for example, cross-talk measurements between two concentric conductors extending along together for a certain distance embodies an unbalanced attenuating network enveloped in an electromagnetic shield such that one or more parasitic capacities applies effectively this shield to surrounding points of ground potential. Such apparatus is limited to achieve unbalanced-to-ground measurements in connection with unbalanced-to-ground apparatus which, in this case, may be represented by the concentric conductor transmission lines.

In accordance with this invention, the apparatus mentioned in the next preceding paragraph and involving the unbalanced attenuating network to effect unbalanced-to-ground measurements may also be employed with equal facility to accomplish balanced-to-ground measurements which, for example, may be made in connection with the balanced-to-ground pairs embodied in a multiconductor cable designed for transmitting intelligence. In a preferred embodiment the invention for this purpose comprises a terminal at ground potential, switching means, and a capacitor having one side connected to the latter grounded terminal and the opposite side applied through the switching means to the unbalanced attenuating network such that the latter grounded terminal may be applied through the latter capacitor to the unbalanced attenuating network to effect balanced-to-ground measurements and may be disconnected from the unbalanced attenuating network to effect unbalanced-to-ground measurements.

A feature of the invention is that it is also expeditiously applicable to signaling transmission systems to connect effectively therein networks balanced and unbalanced with respect to ground potential. An additional feature involves the connection in an electrical system of apparatus which is neither balanced nor unbalanced-to-ground. Another feature is that it may be utilized with equal facility in an oscillator circuit such that the output thereof may be supplied to a load balanced or unbalanced with respect to ground potential. A further feature relates to the connection of a thermionic amplifier, which is inherently unbalanced with respect to ground potential, to a balanced conductor pair, without the usual intermediary input transformer. Accordingly, a general feature is that normally unbalanced networks may be rendered, in accordance with this invention, suitable for use with balanced networks without disturbing the balanced-to-ground condition of the latter, and therefore involves but a single network which is equally serviceable in both balanced and unbalanced circuits.

The invention will be readily understood from the following description taken together with the accompanying drawings, in which:

Fig. 1 shows a general application of the preferred embodiment of the invention;

Figs. 2A, 2B, 2C, 2D, 3A and 3B illustrate the invention applied to electrical measuring apparatus;

Fig. 4 delineates the invention embodied in an oscillator system; and

Fig. 5 represents the invention for connecting a balanced conductor pair to a thermionic amplifier which may be used in a television system.

In the following description the same reference numerals are employed to identify the same elements appearing in the several figures of the drawings.

Referring to Fig. 1, a source 10 of alternating current waves is applied on leads 11 and 12 to a network 13 which, for the purpose of this description, may comprise a pair of resistance elements in series and whose mid-point is applied to ground 14. Leads 24 and 25 connect the network 13 to a network 15 which, for the purpose of this illustration, may comprise a pair of resistances disposed in series in the lead 24 and a pair of resistances disposed in bridge of the leads 24 and 25. An electromagnetic and electrostatic shield 16 encloses the network 15 and is effectively connected thereto by one or more parasitic capacitors 17, 17. A terminal 20, which is common to the lead 25, one side of the network 15 and the shield 16, is connected by a parasitic capacitor 18 to a point 19 at ground potential. It is to be understood that the parasitic capacitors 17 and 18 represent the capacitance of the shield 16 to neighboring points at ground potential as hereinbefore mentioned.

From the foregoing it is obvious that the respective networks 13 and 15 are balanced and unbalanced with respect to ground potential. Assuming for the moment that the network 13 is connected alone to the source 10, then equal amounts of current are caused to flow through both branches of the network 13 to the ground 14. However, as the balanced network 13 is metallically connected by leads 24 and 25 to the unbalanced network 15, then unequal amounts of current are caused to flow through the branches of the network 13 to the ground 14. In other words, the normal balanced-to-ground condition of the network 13 is upset.

In accordance with this invention as exemplified in Fig. 1, there is provided an arrangement which compensates for or neutralizes the effect of the parasitic capacitor 18, and which, therefore, tends to maintain the normal balanced-to-ground condition of the network 13. This arrangement comprises a capacitor 21 whose one side is connected to the lead 24 and the opposite side to ground 23. The capacitor 21 whose capacitance equals substantially the capacitance of the parasitic capacitor 18 tends to ensure that equal amounts of current will flow through both branches of the network 13 to the ground 14. In view of this arrangement, networks balanced and unbalanced with respect to ground potential may be metallically connected without undue ground currents, as the balanced-to-ground condition of the one network would be substantially maintained.

Fig. 2A shows generally an arrangement for measuring cross-talk between a disturbing pair 28 and a disturbed pair 29, both of which pairs are contained in a multiconductor cable 30, and embodies a source of alternating current waves 31 applied through an input transformer 32 whose output winding 33 is connected to the near end of the disturbing pair 28 terminated at the far end in a suitable network 34. The disturbed pair 29 is terminated at the near end in a network 35 and at the far end in a network 36 across which are applied terminals 37, 37 of a double pole, double throw switch 38. It is to be understood that both the disturbed and disturbing pairs are balanced with respect to ground potential.

Across the secondary winding 33 and in shunt of the disturbing pair 28 is the input of an attenuating network 39 whose output is applied through a shielded transformer 40 to a terminating network 27. The latter is applied to terminals 41, 41 of the switch 38 whose terminals 42, 42 are connected through an amplifier-detector 43 to an indicator 44. The shield 16 envelops the attenuating network 39, together with the input winding of the transformer 40. The terminal 20, which is common to one side of the input to the attenuating network 39 and also to one side of the latter and to the shield 16, is connected by the parasitic capacitor 18 to the point 19 at ground potential. It is to be understood that the network 27, together with the network 36, serves to terminate the respective transformer 40 and disturbed pair 29 when the switch 38 is either open or being operated to the terminals 37, 37 or 41, 41. The operation of Fig. 2A will be presently explained.

Fig. 2B shows a disturbing coaxial conductor 50 and a disturbed coaxial conductor 51 between which cross-talk measurements may be made by substituting Fig. 2B between the lines X—X in Fig. 2A.

Figs. 2C and 2D illustrate respective apparatus balanced and unbalanced with respect to ground potential and through which transmission or insertion loss measurements may be accomplished by substituting the proper figure between either the lines Y—Y or X—X of Fig. 2A. In Fig. 2C impedances 52, 52 are inserted in both branches of the circuit in series with the balanced apparatus on both sides thereof while in Fig. 2D impedances 53, 53 are disposed in series in but one branch of the circuit on both sides of the unbalanced apparatus. In addition, Fig. 2D includes a ground connection 49 disposed in the same lead which, as hereinbefore mentioned, embodies the common terminal 20, Fig. 2A, connected through the parasitic capacitor 18 to the point 19 at ground potential.

In the operation of Figs. 2A, 2B, 2C and 2D the switch 38 is initially actuated to the upward or calibrate position and the wave source 31 is adjusted to the proper testing frequency and voltage magnitude. Then, the switch 38 is actuated to the downward or measure position and the wave source 31 is adjusted to the proper frequency and voltage magnitude, with the cable 30, under test, disconnected from the winding 33 and the network 36, and the latter applied in shunt of the winding 33. The gain of the amplifier detector 43 is now adjusted to provide a certain reading on the indicator 44. Then, the switch 38 is actuated to the upward or calibrate position and the attenuating network 39 is adjusted until the same reading is produced on the indicator 44. Then, the switch 38 is actuated to the downward or measure position, and, with the connections as shown in Fig. 2A, the gain of the amplifier-detector 43 is adjusted to provide a certain reading on the indicator 44.

Next, the switch 38 is returned to the upward or calibrate position and the attenuating network 39 is adjusted until the certain reading is again produced on the indicator 44. The difference in the readings of the attenuating network 39 occasioned by the two readings represents the cross-talk passing from the disturbing pair 28 to the disturbed pair 29, Fig. 2A, or from the disturbing pair 50 to the disturbed pair 51, Fig. 2B, or the transmission or insertion loss of the balanced and unbalanced apparatus shown in respective Figs. 2C and 2D.

Referring to Fig. 2A, it has been previously pointed out that the parasitic capacitor 18 serves to connect a point 19 at ground potential to the terminal 20 which is common to the shield 16 and to one side of the input circuit for the attenuating network 39 as well as one side of the latter. Therefore, the measurement of electrical characteristics involving the unbalanced electrical apparatus illustrated in Figs. 2B and 2D will be substantially correct while the measurement of electrical characteristics concerning the balanced apparatus illustrated in Figs. 2A and 2C will be incorrect. The error involved in both of the latter is occasioned by the connection of the common terminal 20 through parasitic capacitor 18 to the point 19 at ground potential, as such connection serves to cause unequal currents to flow to ground in the balanced and disturbing conductor pair 28 of Fig. 2A, and the balanced apparatus of Fig. 2C. Thus, there is upset the normal balanced-to-ground condition of the disturbing pair 28 and apparatus shown in the respective Figs. 2A and 2C.

In accordance with this invention as exemplified in connection with Figs. 2A and 2C, there is provided an arrangement which compensates for or neutralizes the effect of the parasitic capacitor 18, and which, therefore, tends to maintain the normal balanced-to-ground condition of the conductor pair 28 and the apparatus of Fig. 2C. Accordingly, the arrangement of this invention renders the attenuating network 39 suitable for accomplishing measurements both with respect to the balanced apparatus of Figs. 2A and 2C and to the unbalanced apparatus of Figs. 2B and 2D, and comprises as shown in Fig. 2A a capacitor 21 whose one terminal is connected to a point 23 at ground potential and whose opposite terminal may be applied by a single pole, single throw switch 59 to a terminal 60 which is embodied in the input circuit of the unbalanced attenuating network 39 in a side which is opposite to that embodying the common terminal 20 connected through the parasitic capacitor 18 to the point 19 at ground potential as previously mentioned.

Thus, the capacitor 21 may be connected in the input circuit of the unbalanced attenuating network 39 by a closure of the switch 59 to achieve measurements with the balanced apparatus of Figs. 2A and 2C and may be removed from such input circuit by opening the switch 59 to achieve measurements with the unbalanced apparatus of Figs. 2B and 2D. The insertion of the capacitor 21 and ground point 23 associated therewith in the measuring circuit serves to cause equal amounts of current to flow in the several branches of either the balanced conductor pair 28 of Fig. 2A or the balanced apparatus of Fig. 2C, and hence enables the achievement of accurate measurements of the electrical characteristics of such balanced apparatus when the unbalanced attenuating network 39 is utilized for this purpose.

Consequently, in accordance with the invention described hereinbefore in connection with Figs. 2A, 2B, 2C and 2D, a single measuring apparatus embodying an attenuating network unbalanced with respect to ground potential may be utilized to effect electrical measurements involving apparatus both balanced and unbalanced with regard to ground potential.

Fig. 3A illustrates primarily an arrangement for measuring cross-talk between a disturbing conductor pair and a disturbed conductor pair, both of which are embodied in a multiconductor cable, and is in general identical with Fig. 2 except in the respect that the secondary windings of input transformer 65 are so arranged that the inputs of the attenuator 39 and the disturbing pair 28 are applied in series to the source 31 of alternating current waves. The arrangement shown in Fig. 2C may also be substituted between the lines Y—Y of Fig. 3A. Fig. 3A and the modification thereof including Fig. 2C are, therefore, utilized exclusively to achieve measurements involving apparatus balanced with respect to ground potential.

Fig. 3B is employed to accomplish measurements only in connection with apparatus unbalanced with respect to ground potential and shown in Figs. 2B and 2D, and for this purpose includes the apparatus shown to the right of the line Z—Z of Fig. 3A together with either Fig. 2B or Fig. 2D substituted between the lines X—X. In Fig. 3B the two secondary windings of the transformer 65 are connected in series in one side of the input circuit to the apparatus under test and the unbalanced attenuator 39, as the parasitic capacitor connection to ground is effective in the other side of the input circuit.

In general, the operation of Figs. 3B and 3A, together with the modifications thereof pointed out above, accomplishes measurements involving balanced and unbalanced apparatus as mentioned hereinbefore in connection with Figs. 2A, 2B, 2C and 2D.

Fig. 4 shows the invention applied to an oscillator 70 of any suitable type whose output may be supplied through an output transformer 71 to output terminals 72, 72, which may be connected to either a balanced or unbalanced load, not shown, and which may be controlled by an unbalanced attenuator 73. The output transformer 71 is enclosed in electromagnetic and electrostatic shield 74 while the secondary winding of this transformer and the attenuator 73 are enveloped by the electromagnetic shield 76. One output terminal 72 is connected by a strap 76 to point 77 on the magnetic shield 16. This point is applied by the parasitic capacitor 18 to the point 19 at ground potential. It will be understood from the foregoing description that a connection of the terminals 72, 72 to a load balanced with respect to ground potential, not shown, will cause a flow of unequal amounts of current through the branches of such load.

In accordance with this invention, the effect of the parasitic capacitor 18 may be compensated for by connecting one terminal of a variable capacitor 80 to the side of the output circuit embodying the other output terminal 72 and the opposite terminal to ground 81. The capacitor 80 may be adjusted until its capacitance equals substantially that of the parasitic capacitor 18. This will cause substantially equal currents to flow in the branches of the balanced load circuit, not shown, applied to the terminals 72, 72. It is to be understood that the capacitor 80 may have associated therewith a single pole, single throw switch 82 whereby the capacitor 80 may be applied to one of the output terminals 72 for a load balanced with respect to ground potential, not shown, and disconnected therefrom for a load unbalanced with respect to ground potential, not shown.

Fig. 5 shows the invention applied to an arrangement whereby a vacuum tube amplifier 85, which is inherently unbalanced with respect to ground potential, may be connected, without an input transformer, to a balanced conductor pair 83 and 84 embodied in a multiconductor cable 87 and applied across input terminals 88, 88. The latter may be connected to a suitable source of alternating current waves, not shown. The output stage of the amplifier 85 is connected through an output transformer 89 to a concentric conductor 90 which supplies the amplifier output to output terminals 91, 91. A magnetic shield 92 envelops the output transformer 89 while a magnetic shield 16 encloses both the shield 89 and the amplifier 85. Choke coils 94, 95 and 96 preclude grounding of the shield 93 through the respective sources of direct current voltage associated with the former and supplying the amplifier 85. In this connection it is to be observed that one such voltage source is applied through the choke coil 95 to the shield 16 and to the shield 92, as will be hereinafter pointed out.

Parasitic capacitor 18, which represents the capacitance of the shield 16 to surrounding points at ground potential, serves to connect to a point 19 at ground potential a terminal 98 which is common to the conductor 83, one side of the input of the amplifier 85 and the shield 16. A strap 99 connects electromagnetic and electrostatic shields 16 and 92 while a parasitic capacitor 100 represents the capacitance of both magnetic shields 16 and 92 to the outer conductor of the concentric conductor 90.

In accordance with the invention as applied to Fig. 5, a variable capacitor 101 applied across the outer conductor of the concentric conductor 90 and a terminal 102, which is common to the conductor 84 and the other side of the input of the amplifier 85, serves to neutralize the effect of the parasitic capacitor 100. A suitable balancing network 103 applied intermediate the common terminal 102 and grounded terminal 104 serves to neutralize the admittance of the shield 16 to ground through the choke coils 94, 95 and 96 and through the parasitic capacitor 18. This amplifier, shown in its simplest form, is suitable for use in a television system as pointed out in the Bell Laboratories Record, October 1939, at page 36.

It is to be understood that while the invention is specifically described to compensate for or neutralize a particular parasitic capacitor-to-ground connection, it serves actually to compensate for a ground admittance which includes the particular parasitic capacitor together with the parasitic conductance effect.

Also, it is to be understood that the invention is equally applicable to measurements or connections involving conductors or other apparatus which may be neither balanced nor unbalanced-to-ground. This situation would tend to arise in those cases in which normally balanced apparatus would possess unbalance due to manufacturing imperfections so that a conventional balanced attenuator when connected to such apparatus would tend to upset an anticipated balanced or unbalanced connection. In a measuring system this would tend to provide incorrect readings.

What is claimed is:

1. In combination, two conductor pairs extending together for a certain distance, an unbalanced attenuator, a transformer having primary and secondary windings, the primary winding being connected to the output of said attenuator, a shield enclosing said attenuator and the primary winding of said transformer, a source of alternating current waves, circuit means to connect said source to one of said conductor pairs and to the input of said attenuator, a common terminal connecting said shield and said attenuator to one side of said circuit means, a parasitic capacitor effectively applying said common terminal to a terminal at ground potential, indicating means, and means to connect alternately said indicating means to the other of said conductor pairs and the secondary winding of said transformer; means to compensate for the effect of said parasitic capacitor comprising a connection having ground potential, a capacitor and circuit means to connect one terminal of said capacitor to said ground potential connection and the opposite terminal of said capacitor to a side of said first-mentioned circuit means which side is opposite to the side of said first-mentioned circuit means embodying said common terminal.

2. In combination, apparatus balanced or unbalanced with respect to ground, an unbalanced attenuator, a transformer having primary and secondary windings, the primary winding being connected to the output of said attenuator, a shield enveloping said attenuator and the primary winding of said transformer, a source of alternating current waves, circuit means to connect said source to the outputs of said apparatus and said attenuator, a common terminal connecting said shield and said attenuator to one side of said circuit means, one or more parasitic capacitors effectively applying said common terminal to at least one terminal at ground potential, indicating means, and means to connect alternately the output of said apparatus and the secondary winding of said transformer to said indicating means; means to render said attenuator suitable for accomplishing measurements involving said apparatus and thereby tending to compensate for the effect of said parasitic capacitors comprising a terminal having ground potential, switching means, and a capacitor having one terminal connected to said last-mentioned grounded terminal and the opposite terminal applied through said switching means to the other side of said circuit means such that said last-mentioned grounded terminal may be applied through said last-mentioned capacitor to said circuit means for apparatus balanced with respect to ground potential and may be disconnected therefrom for apparatus unbalanced with respect to ground potential.

3. In the combination according to claim 2 in which said apparatus balanced with respect to ground comprises a pair of balanced electrical conductors extending together for a certain distance and said apparatus unbalanced with respect to ground comprises a pair of concentric conductors extending together for a certain distance.

4. In combination, apparatus which may be neither balanced nor unbalanced with respect to ground, an unbalanced attenuator, a transformer having primary and secondary windings, the primary winding being connected to the output of said attenuator, a shield enveloping said attenuator and the primary winding of said transformer, a source of alternating current waves, circuit means to connect the inputs of said apparatus and said attenuator in parallel to said source, a common terminal connecting said shield and said attenuator to one side of said circuit means, a parasitic capacitor effectively applying said common terminal to a terminal at ground potential, indicating means, and means to connect alternately the output of said apparatus and the secondary winding of said transformer to said indicating means, and means to compensate for the effect of said parasitic capacitor connection to ground comprising a terminal having ground potential and a capacitor having one terminal applied to said latter-mentioned grounded terminal and the opposite terminal applied to the other side of said circuit means.

5. In combination, apparatus which may be neither balanced nor unbalanced with respect to ground, an unbalanced attenuator, a transformer having primary and secondary windings, the primary winding being connected to the output of said attenuator, a shield to envelop said attenuator and the primary winding of said transformer, a common terminal connecting said attenuator and said shield to ground potential through a parasitic capacity, a source of alternating current waves, circuit means to connect the inputs of said apparatus and said attenuator in series to said source, indicating means, and means to connect alternately the output of said apparatus and the secondary winding of said transformer to said indicating means, means to neutralize the effect of said parasitic capacity connection to ground comprising a terminal having ground potential and a capacity having one side applied to said latter grounded terminal and the opposite side applied to said circuit means.

GREGORY N. SLEZSKINSKY.